United States Patent [19]

Cornier et al.

[11] 3,991,256

[45] Nov. 9, 1976

[54] PREPARING ELECTROSTATOGRAPHIC PRINTING SHEET, ARTICLE THEREOF AND ARTICLE COATED WITH QUATERNARY AMMONIUM ELECTROCONDUCTIVE RESIN

[75] Inventors: Sally P. Cornier, Sanford; Ben A. Tefertiller; Richard J. Dolinski, both of Midland, all of Mich.

[73] Assignee: The Dow Chemical Company, Midland, Mich.

[22] Filed: Dec. 27, 1974

[21] Appl. No.: 537,044

Related U.S. Application Data

[62] Division of Ser. No. 277,319, Aug. 2, 1972, Pat. No. 3,887,496.

[52] U.S. Cl. .............................. 428/514; 427/74; 427/391; 428/537; 428/510; 162/138; 96/1.5
[51] Int. Cl.$^2$ .................. B32B 27/10; B05D 5/12; B05D 3/02
[58] Field of Search ............. 117/155 UA, 201, 218; 428/537, 510, 514; 162/138; 96/1.5, 1.8; 427/74, 391

[56] References Cited
UNITED STATES PATENTS

| | | | |
|---|---|---|---|
| 2,616,818 | 11/1952 | Azorlosa | 117/155 UA |
| 2,945,775 | 7/1960 | Lehman et al. | 117/155 UA |
| 3,479,215 | 11/1969 | Cavagna et al. | 117/201 |
| 3,544,318 | 12/1970 | Boothe et al. | 117/201 X |
| 3,754,909 | 8/1973 | Feltzin et al. | 162/138 X |
| 3,798,032 | 3/1974 | Miller | 162/138 X |
| 3,830,655 | 8/1974 | Rothwell et al. | 117/155 UA |
| 3,861,954 | 1/1975 | Funderburk | 96/1.5 X |
| 3,864,158 | 2/1975 | Timmerman et al. | 162/138 X |
| 3,887,496 | 6/1975 | Cornier et al. | 162/138 X |

OTHER PUBLICATIONS

Dolinski et al., Formulated Conductive Coatings for Reprographic Papers, Mar., 1971, pp. 26–38.

*Primary Examiner*—P. C. Ives
*Attorney, Agent, or Firm*—D. B. Kellom; A. R. Whale

[57] ABSTRACT

An improved electroconductive resin composition is obtained by using a water-dispersible, film-forming acrylamide polymer as a binder and extender for a water-soluble quaternary ammonium electroconductive resin. Particularly useful is a self-binding blend of about 65–95 wt. % polyvinylbenzyltrimethylammonium chloride and about 5–35 wt. % nonhydrolyzed polyacrylamide which can be formulated as an aqueous dispersion with clay or other printing pigments. Applied to a nonmetallic substrate, such as paper or an organic polymer film, the improved electroconductive resin composition reduces the surface electrical resistivity of the substrate and also provides improved holdout to aromatic and aliphatic solvents.

11 Claims, No Drawings

PREPARING ELECTROSTATOGRAPHIC PRINTING SHEET, ARTICLE THEREOF AND ARTICLE COATED WITH QUATERNARY AMMONIUM ELECTROCONDUCTIVE RESIN

This is a division of application Ser. No. 277,319 filed Aug. 2, 1972 now U.S. Pat. No. 3,887,496.

BACKGROUND

An essential part of electrostatographic printing systems widely used for office copiers, computer print outs, data retrieval, etc., is the electroconductive coating composition used to improve the electrical conductivity of the substrate reprographic paper. Paper has a surface electrical resistivity (SER) greater than about $10^{14}$ ohms/square at 10% relative humidity (RH). But most electrophotographic copiers require a maximum SER of about $10^{10}$–$10^{11}$ ohms/square. Electrographic printing also requires a similar lower SER.

Particularly effective electroconductive additives for paper are water-soluble quaternary ammonium polymers such as the poly(vinylbenzyltrimethylammonium chloride) resin used in Silvernail and Zembal, U.S. Pat. No. 3,011,918. Other quaternary ammonium electroconductive resins include the poly(diallyldimethylammonium chloride) resin of Boothe and Hoover, U.S. pat. No. 3,544,318, the quaternized polyethylenimine of Cavagna and Walker, U.S. Pat. No. 3,479,215, and the quaternized polyepichlorohydrin of Rogers and Woehst U.S. Pat. No. 3,320,317.

These electroconductive resins are seldom applied neat to the base substrate. Rather they are typically applied as a formulated, aqueous coating composition containing the electroconductive resin, a film-forming binder such as starch, polyvinyl alcohol or a latex, and a suitable pigment such as clay, calcium carbonate, etc. The type and amount of binder has a pronounced effect not only on SER, but also on resistance to organic solvents used in subsequent processing. The solvent resistance or "holdout" to aromatic solvents used in coating the photosensitive ZnO layer and to aliphatic solvents used in liquid toning is important. The pigment has less effect on conductivity, but influences the stiffness, tack, gloss and brightness of the reprographic sheet.

Although starch is commonly used as a binder with quaternary ammonium resins, it provides only moderate solvent holdout and at high concentrations has a detrimental effect on resin conductivity. With the poly(vinylbenzyltrimethylammonium chloride) resin, polyvinyl acetate provides high conductivity but poor solvent resistance while polyvinyl alcohol gives high solvent resistance and poor conductivity. Methyl cellulose as a binder provides good conductivity and solvent resistance but is costly.

Paper has long been sized with such materials as rosin and starch to improve its resistance to grease, oil and water. Sizing of paper with certain acrylamide polymers is described by Lehman, Silvernail and Stilbert U.S. Pat. No. 2,945,775. Azorlosa U.S. Pat. No. 2,616,818 and U.S. Pat. No. 2,661,309 disclose other paper coating compositions containing acrylamide copolymers as a pigment binder to provide improved brightness, smoothness, gloss and feel.

STATEMENT OF THE INVENTION

It has been discovered that water-soluble quaternary ammonium electroconductive resins can be combined with certain water-dispersible, film-forming acrylamide polymers to give an aqueous electroconductive coating composition that has superior electroconductive properties combined with improved solvent holdout to both aromatic and aliphatic hydrocarbons. More specifically, the improved electroconductive resin composition contains in combination: (A) A water-soluble quaternary ammonium electroconductive resin, and (B) About 0.05–0.50 parts, based on weight of the electroconductive resin (A), of a water-dispersible, substantially nonionic, film-forming acrylamide polymer containing at least 20 wt. % polymerized acrylamide and having a 0.5 wt. % aqueous solution Brookfield viscosity of less than about 5.0 cps at pH 5–6 and 25° C. This self-binding composition can be applied to nonmetallic substrates, such as paper or organic polymers, and dried to give an electroconductive coating.

A typical formulation of the improved electroconductive resin composition containing 40 parts of poly(vinylbenzyltrimethylammonium chloride) resin, 10 parts of polyacrylamide having a 0.5 wt. % Brookfield viscosity of about 2.0 cps, and 50 parts of clay pigment applied at a two side coating weight of 1.5 lbs. per 3000 ft.$^2$ gave a SER of $4.0 \times 10^9$ ohms/square at 10% RH with a 10 second toluene penetration of 8% and isoparaffin penetration of 4%. A conventional starch formulation using 25 parts of poly(vinylbenzyltrimethylammonium chloride, 25 parts of starch, and 50 parts clay applied at a two side coating weight of 3.0 lbs. per 3000 ft.$^2$ gave a SER of $1.6 \times 10^{10}$ with a 10 second toluene penetration of 20% and an isoparaffin penetration of 10%. Thus, the formulation with polyacrylamide as binder provides improved SER and solvent holdout with less electroconductive resin.

GENERAL DESCRIPTION

A. Quaternary Ammonium Electroconductive Resins

Essential herein is a water-soluble quaternary ammonium electroconductive resin such as described by Dolinski and Dean, Chem. Tech., 1, 304–309 (1971). Particularly suitable are the poly(vinylbenzyltrimethylammonium chloride) resins used in Silvernail and Zembal U.S. Pat. No. 3,011,918 and prepared by the improved process of Sonnabend U.S. Pat. No. 3,607,989. With the poly(diallyldimethylammonium chloride) resin of Boothe and Hoover U.S. Pat. No. 3,544,318 and the quaternized polyepichlorohydrin of Rogers and Woehst U.S. Pat. No. 3,320,317 the polymeric acrylamide binder gives significantly improved solvent holdout.

B. Acrylamide Polymers

Also essential in the improved electroconductive resin coating composition is a substantially nonionic, film-forming acrylamide polymer which functions both as a binder and as an extender for the quaternary ammonium electroconductive resin. Since the coating composition is prepared and applied as an aqueous solution or dispersion, the acrylamide polymer must be water-dispersible with a 0.5 wt. % aqueous solution Brookfield viscosity less than about 5.0 cps at pH 5–6 and 25° C.

Particularly suitable herein are water-soluble homopolymers of acrylamide. However, the degree of hydrolysis of the acrylamide homopolymer, or the presence in the polymer of an equivalent amount of free carboxylic acid or other ionic species, must be controlled. It has been found that less than about 5% hydrolysis based on acrylamide, and preferably less than about 2%, is required for the substantially nonionic acrylamide polymers used herein.

Water-soluble or water-dispersible copolymers of acrylamide and at least one other nonionic monomer copolymerizable therewith can also be used. Typical comonomers include styrene, vinyl acetate, acrylonitrile, methacrylonitrile, vinyl alkyl ethers, vinyl chloride, vinylidene chloride, alkyl acrylates, alkyl methacrylate, methacrylamide and the like. More hydrophilic monomers such as N-methylolacrylamide and hydroxypropyl acrylate can be used in limited amount, preferably in a terpolymer.

To provide the essential effect with the quaternary ammonium resin, it is desirable that the acrylamide polymer contain at least about 20 wt. % of polymerized acrylamide. The preferred amount of acrylamide will depend on the specific copolymer.

Many suitable film-forming acrylamide polymers are commercially available as aqueous solutions or dispersions containing 10–60 wt. % polymer solids. Such products are particularly convenient for combining with the quaternary ammonium electroconductive resin.

C. Electroconductive Resin Coating Composition

The essential components of the improved electroconductive resin composition are preferably combined in an aqueous coating composition. About 0.05–0.50 parts of acrylamide polymer per part of quaternary ammonium resin is required for an effective self-binding composition.

Depending on the requirements of the coating operation and final product, the composition can be further formulated with standard additives. Pigments such as coating grade clays, calcium carbonate, and titanium dioxide can be added to reduce gloss, tack and increase brightness. Other extenders and binders can also be added. Optimum formulations depend on specific process and end use specifications. However, the following formulation ranges are generally applicable using a clay pigment: about 25–50 wt. % quaternary ammonium resin, about 5–20 wt. % acrylamide binder, and about 40–70 wt. % pigment. Also a maximum of about 40–55 wt. % total solids is required for handling in many coating machines. Determination of optimum formulations can be done using the procedures described below.

D. Coating Technology

The improved electroconductive resin coating composition can be used to increase the substrate electroconductivity as required for reprographic materials. The substrate normally is paper, but the composition can be applied to other nonmetallic substrates including organic polymer films to increase the surface electrical conductivity and thus dissipate static charge. Although separate coatings can be used, the improved electroconductive resin coating composition is preferably applied to the substrate as an aqueous mixture of the electroconductive resin and acrylamide binder.

Electrostatographic printing paper is prepared by coating a suitable base paper with the improved electroconductive resin coating composition in an amount sufficient to increase the electroconductivity of the treated paper to the required level. Most current copiers require a paper with maximum SER of about $10^{10}$–$10^{11}$ ohm/square. A blade coater is normally used although a size press, roll coater, or air knife are satisfactory. Two-side coating is preferred to minimize toner deposition in nonimage areas and backprinting. After drying, the appropriate photoconductive or dielectric coating is applied to give the finished electrostatographic paper. Alternately, for some applications, a single side application of the electroconductive resin composition may be desirable.

With the improved electroconductive coating compositions, total two-side coating weights of about 0.1–2.5 lbs. of quaternary ammonium electroconductive resin/3000 ft.$^2$ of paper (about 0.16–4.0 g/m$^2$) are generally suitable. For typical coating formulations this corresponds to a total two-side electroconductive coating weight of about 0.2–5.0 lbs./3000 ft.$^2$ (about 0.3–8.0 g/m$^2$).

The following examples further illustrate the present invention. Unless otherwise stated, all parts and percentages are by weight. The surface electrical resistivity (SER) is measured at 10% relative humidity (RH) according to the general procedure of ASTM D-257-66 using a Keithley Electrometer Model 610B with a Model 6105 Resistivity Adapter operating at 100 v. The solvent holdout is measured visually by means of the solvent penetration test described by A. S. Diamond, e.a., Tappi, 48, 94A (October 1965), using bromophenol blue as the solvent dye and a standard reference chart.

EXAMPLE 1

P(VBQ)/P(AA) Electroconductive Resin Composition

A. An aqueous quaternary ammonium-polyacrylamide electroconductive resin composition was prepared by mixing 120 parts of a 33.3 wt. % aqueous solution of poly(vinylbenzyltrimethylammonium chloride) prepared by the process of Sonnabend U.S. Pat. No. 3,607,989 with 50 parts of a 20 wt. % aqueous solution of an acrylamide homopolymer having a degree of hydrolysis of 0.5–1.0% and a 0.5% aqueous solution Brookfield viscosity of about 1.4–2.4 cps at pH 5–6 and 25° C. The resulting P(VBQ)/P(AA) composition is a self-binding blend containing about 30 wt.% solids which can be applied directly to a nonmetallic substrate such as paper to form an electroconductive coating.

B. A formulated electroconductive resin coating composition was prepared by blending a slurry of 50 parts of pigment grade clay (Hydrafine clay, J. T. Huber Corp.) in 30 parts water containing 0.6 part tetrasodium pyrophosphate as a dispersant with 170 parts of the aqueous quaternary ammonium-polyacrylamide solution of Example 1A by vigorous mixing. The resulting product contained 40 wt. % solids including, on a total solids basis, 40 wt. % quaternary ammonium resin, 10 wt. % polyacrylamide, and 50 wt. % clay. It forms a smooth, coherent film when applied to a hard surface and dried.

C. To compare the formulated coating composition of Example 1B with a standard commercial starch-clay formulation, an externally sized Kimberly-Clark base stock paper (basis weight 44.6 lbs./3000 ft.$^2$) was coated on both sides with the formulated resin coatings using a Time-Life bench coater. The coater sheets were dried, cut into 6 test strips, and conditioned for 18 hours in a room temperature glove box held at 10% relative humidity (RH) as determined by a Narrow Range Hydrosensor Cell (Hydrodynamics Div., American Instrument Co.). Then the SER was measured by the procedure of ASTM D-257-66. The solvent holdout was measured using a test strip conditioned at room temperature and 50% RH by applying a drop of toluene or isoparaffin (Isopar G — a mixture of isoparaffin having a boiling point of about 160°–180° C from Humble Oil and Refining Corp.) containing a soluble blue dye, blotting the dye after 10 seconds, and visually comparing the penetration on the reverse side of the strip with the reference chart.

Typical results shown in Table 1 indicate the superiority of the quaternary ammonium-polyacrylamide composition in both a lower SER and an improved solvent holdout. Note that the lower SER of Formulation 1B is obtained with a lower coating weight of the electroconductive resin.

side with an unpigmented 50 pts P(VBQ)/50 pts starch composition at a coating weight of 1.2 lbs./3000 ft.$^2$ had a SER of $6.6 \times 10^9$. Both papers contained 0.6 lb. P(VBQ)/3000 ft.$^2$.

F. Formulation 1B was applied to one side of a surface sulfonated polystyrene film at a coating weight of 0.75 lb./3000 ft.$^2$. The coated film had a SER of $5.3 \times 10^9$ ohm/sq. at 10% RH. The coated film was insensitive to the isoparaffin solvent and showed only a slight surface etching after 10 second contact with toluene. The polystyrene film prior to coating with Formulation 1B had a SER of $9.4 \times 10^{10}$ ohms/sq. and was heavily etched and distorted after a 10 second contact with toluene.

Table 1

| P(VBQ)-P(AA) Formulation 1B | | |
|---|---|---|
| | Control | Formulation 1B |
| ECR Resin[a] | 25 pts P(VBQ) | 40 pts P(VBQ) |
| Binder[b] | 25 pts Starch | 10 pts Polyacrylamide |
| Pigment[c] | 50 pts HF Clay | 50 pts HF Clay |
| Coat wt (lbs./3000 ft.$^2$) | 3.0 lbs. | 1.5 lbs. |
| ECR wt (lbs./3000 ft.$^2$) | 0.75 lb. | 0.60 lb. |
| SER, ohms/sq. (10% RH) | $1.6 \times 10^{10}$ | $4.0 \times 10^9$ |
| Toluene penetration[d] | 20% | 8% |
| Isoparaffin penetration[d] | 10% | 4% |

[a]P(VBQ) - Poly(vinylbenzyltrimethylammonium chloride)
[b]Starch - Hydroxyethylated starch PG-280 (Penick & Ford Ltd.)
[c]Clay - Hydrafine Clay
[d]% Penetration in 10 seconds D. An electroconductive paper prepared as in Example 1C using the formulated P(VBQ)-P(AA) composition was top coated on one side with 18–20 lbs./3000 ft.$^2$ of a 7/1 ZnO/acrylic binder photoconductive formulation. Electrophotographic prints were made with a SCM Model 33 copier. The prints had excellent contrast and no background or backprinting was apparent.

The same electroconductive paper was also suitable as a substrate for an electrographic sheet prepared by top coating with a commercial dielectric coating formulation.

E. To compare the improved ECR composition on a neat basis, the base stock paper was coated on one side with 0.75 lb./3000 ft.$^2$ of the 80 pts P(VBQ)/20 pts P(AA) composition of Example 1. Its SER was $1.2 \times 10^9$ ohm/sq. at 10% RH. The same paper coated on one

EXAMPLE 2

Other P(BVQ)/P(AA) Formulations

Using the poly(vinylbenzyltrimethylammonium chloride) resin, polyacrylamide, and pigment clay of Example 1, various P(VBQ)/P(AA)/Clay formulations were prepared and evaluated as described in Examples 1B–C. All formulations were applied as an aqueous mixture containing 40 wt. % total solids.

Typical data given in Tables 2 and 3 demonstrate improved SER with formulations containing about 0.05–0.50 parts P(AA)/part P(VBQ) and about 50–70 parts clay/100 parts total solids. Greater solvent holdout is obtained with higher polyacrylamide levels and total coating weights. Improved SER values, compared to the starch control system, are obtained with significantly lower coating weights and amount of P(VBQ).

Table 2

| | P(VBC)/P(AA)/Clay Formulations | | | | | | | | |
|---|---|---|---|---|---|---|---|---|---|
| Formulation | Control | 2A | | 2B | | 2C | | 2D | |
| P(VBQ) | 50 | 70 | | 80 | | 90 | | 95 | |
| Polyacrylamide | (50 S)[a] | 30 | | 20 | | 10 | | 5 | |
| Clay | 100 | 100 | | 100 | | 100 | | 100 | |
| P(AA)/P(VBQ) | — | 0.43 | | 0.25 | | 0.11 | | 0.05 | |
| Tot. Coat Wt.[b] | 3.0 | 2.1 | 1.5 | 1.9 | 1.3 | 1.7 | 1.5 | 1.6 | 1.5 |
| P(VBQ) Wt.[b] | 0.75 | 0.74 | 0.53 | 0.76 | 0.52 | 0.77 | 0.68 | 0.76 | 0.71 |
| Log SER[c] | 10.20 | 9.61 | 9.77 | 9.68 | 9.72 | 9.25 | 9.86 | 9.26 | 9.23 |
| Toluene[d] | 15/20 | 4/6 | 4/8 | 4/8 | 4/8 | 6/10 | — | 6/20 | 15/20 |
| Isoparaffin[d] | 4/10 | 2/4 | 2/4 | 2/4 | 2/4 | 4/6 | — | 4/15 | 6/15 |

[a]Hydroxyethylated starch
[b]Weight in lbs./3000 ft.$^2$ coated two sides
[c]LOG SER (ohms/sq. at 10% RH)
[d]% Penetration 10 sec./15 sec.

Table 3

| | P(VBQ)/P(AA)/Clay Formulations | | | | |
|---|---|---|---|---|---|
| Formulation | Control | 3A | 3B | 3C | 3D |
| P(VBQ) | 50 | 40 | 36 | 32 | 24 |

Table 3-continued

P(VBQ)/P(AA)/Clay Formulations

| Formulation | Control | 3A | | 3B | | 3C | | 3D |
|---|---|---|---|---|---|---|---|---|
| Polyacrylamide | (50 S)[a] | 10 | | 9 | | 8 | | 6 |
| Clay | 100 | 50 | | 55 | | 60 | | 70 |
| P(AA)/P(VBQ) | — | 0.25 | | 0.25 | | 0.25 | | 0.25 |
| Tot. Coat Wt.[b] | 3.0 | 1.9 | 1.3 | 2.1 | 1.7 | 2.3 | 1.9 | 2.4 |
| P(VBQ) Wt.[b] | 0.75 | 0.76 | 0.52 | 0.76 | 0.61 | 0.74 | 0.61 | 0.76 |
| Log SER[c] | 10.20 | 9.68 | 9.72 | 9.61 | 9.72 | 9.87 | 9.87 | 10.1 |
| Toluene[d] | 15/20 | 4/8 | 4/8 | 2/4 | 4/6 | 2/4 | 6/10 | 4/6 |
| Isoparaffin[d] | 4/10 | 2/4 | 2/4 | 2/4 | 2/4 | 2/2 | 4/8 | 2/4 |

[a]Hydroxyethylated starch
[b]Weight in lbs./3000 ft.² coated two sides
[c]Log SER (ohms/sq. at 10% RH)
[d]% Penetration 10 sec./15 sec.

EXAMPLE 3

Other Quaternary Ammonium Resins

Using the polyacrylamide binder and pigment clay of Example 1, aqueous electroconductive coating compositions were prepared using several commercial quaternary ammonium electroconductive resins (ECR) and the following formulations:

Control: 25 pts ECR/25 pts starch/50 pts clay
3A: 28 pts ECR/12 pts P(AA)/60 pts clay
3B: 32 pts ECR/8 pts P(AA)/60 pts clay
3C: 36 pts ECR/4 pts P(AA)/60 pts clay All formulations were applied as 40% solids to give a ECR coating weight of 0.75 lb./3000 ft.² using the procedures of Example 1C. The formulations were not optimized.

Typical results shown in Table 4 indicate improved solvent holdout with the polyacrylamide formulations with no significant loss in SER values for the resins tested.

Table 4

Other Quaternary Ammonium ECR Resins

| Formulation Binder Wt. % ECR | Control Starch 25 | 3A P(AA) 28 | 3B P(AA) 32 | 3C P(AA) 36 |
|---|---|---|---|---|
| ECR | Poly(vinylbenzyltrimethylammonium chloride)[a] | | | |
| Log SER | 10.20 | 10.04 | 9.87 | 9.61 |
| Toluene | 15 | 1 | 2 | 6 |
| Isoparaffin | 4 | 1 | 2 | 4 |
| ECR | Poly(diallyldimethylammonium chloride)[b] | | | |
| Log SER | 9.56 | 9.84 | 9.68 | 9.48 |
| Toluene | 25 | 4 | 15 | 15 |
| Isoparaffin | 15 | 2 | 4 | 6 |
| ECR | Quaternized Polyepichlorohydrin[c] | | | |
| Log SER | 9.88 | 9.90 | 9.90 | 9.86 |
| Toluene | 50 | 25 | 40 | 40 |

Table 4-continued

Other Quaternary Ammonium ECR Resins

| Formulation Binder Wt. % ECR | Control Starch 25 | 3A P(AA) 28 | 3B P(AA) 32 | 3C P(AA) 36 |
|---|---|---|---|---|
| Isoparaffin | 25 | 6 | 15 | 25 |

[a]Dow ECR 34 Resin
[b]Merck 261 Resin
[c]Nalco 61J16 Resin

EXAMPLE 4

Other Acrylamide Polymers

A variety of water-dispersible film-forming acrylamide can be used in the electroconductive resin compositions provided the comonomers are substantially nonionic. Poor results were obtained with acrylamide polymers having a degree of hydrolysis greater than about 5 wt. %, and with copolymers of such ionic monomers as acrylic acid, sodium sulfoethyl acrylate, etc. Increasing the acrylamide content generally improves the solvent holdout.

Screening test data for a number of acrylamide copolymers are given in Table 5. These data were obtained by the method of Example 1C using a standard formulation of 10 parts acrylamide binder, 40 parts P(VBQ), and 50 parts clay applied as a 40% solids blend to give a total coating weight of 1.5 lbs./3000 ft.² coated both sides.

Table 5

Other Acrylamide Polymers

| | Binder[a] | | SER | % Penetration (10 sec.) | |
|---|---|---|---|---|---|
| | | | | Toluene | Isoparaffin |
| 5-0 | Starch | (Control) | 1.0–3.0 × 10¹⁰ | 20–25 | 10–15 |
| 5-1 | AA/VCl₂ | 20/80 latex | 3.1 × 10⁹ | 25 | 10 |
| 5-2 | AA/S | 40/60 latex | 6.9 × 10⁹ | 10 | 10 |
| 5-3 | AA/S/NMAA | 60/38/2 | 6.0 × 10⁹ | 30 | 15 |
| 5-4 | AA/HBA | 75/25 | 2.3 × 10¹⁰ | 10 | 20 |
| 5-5 | AA/VCN | 80/20 | 4.9 × 10⁹ | 15 | 10 |
| 5-6 | AA/VAc | 80/20 | 6.3 × 10⁹ | 20 | 15 |

[a]AA—acrylamide
HBA—Hydroxybutyl acrylate
NMAA—N-Methylolacrylamide
S—Styrene
Vac—Vinyl acetate
VCN—Acrylonitrile
VCl₂—Vinylidene chlorie

We claim:

1. An electroconductive paper having incorporated as the electroconductive additive an electroconductive resin coating composition containing as essential elements:

A. A water-soluble quaternary ammonium electroconductive resin, and

B. About 0.05–0.50 parts, based on the weight of the electroconductive resin, of a water-dispersible, substantially nonionic acrylamide polymer containing at least 20 wt. % polymerized acrylamide and having a 0.5 wt. % aqueous solution viscosity of less than about 5.0 cps at pH 5–6 and 25° C in an amount effective to increase the surface electroconductivity of the treated paper.

2. The electroconductive paper of claim 1 where the quaternary ammonium resin is a water-soluble poly(vinylbenzyl quaternary ammonium chloride), poly(diallyldimethylammonium chloride), quaternized polyethylenimine, or quaternized polyepichlorohydrin resin.

3. The electroconductive paper of claim 1 where the quaternary ammonium resin is a water-soluble poly(-vinylbenzyltrimethylammonium chloride) resin.

4. The electroconductive paper of claim 1 where the acrylamide polymer is a homopolymer of acrylamide with a degree of hydrolysis of less than about 5 percent and a 0.5 wt. % aqueous solution viscosity of about 1.4 to 5.0 cps at pH 5–6 and 25° C.

5. The electroconductive paper of claim 1 where the acrylamide polymer is a water-dispersible polymer of about 20–95 wt. % acrylamide and about 80–5 wt. % of a nonionic monomer copolymerizable therewith.

6. The electroconductive paper of claim 1 where the electroconductive resin coating consists of about 25–50 wt. % of a water-soluble poly(vinylbenzyltrimethylammonium chloride), about 5–20 wt. % of a homopolymer of acrylamide with a degree of hydrolysis of less than about 5 percent, and about 40–70 wt. % of a paper coating pigment.

7. The electroconductive paper of claim 6 containing about 0.1–2.5 lbs. of the quaternary ammonium electroconductive resin per 3000 ft.$^2$ of paper coated two sides and having a surface electrical resistivity of less than about $10^{11}$ ohms at 20°–25° C and 10% relative humidity.

8. In a process for preparing an electrostatographic printing sheet containing a water-soluble quaternary ammonium resin as an electroconductive additive, the improvement which comprises applying to the base substrate an electroconductive resin coating composition containing as essential elements:

A. A water-soluble quaternary ammonium electroconductive resin, and

B. About 0.05–0.50 parts, based on the weight of the electroconductive resin, of a water-dispersible, substantially nonionic acrylamide polymer containing at least 20 wt. % polymerized acrylamide and having a 0.5 wt. % aqueous solution viscosity of less than about 5.0 cps at pH 5–6 and 25° C in an amount sufficient to give the coated substrate a surface electrical resistivity of less than about $10^{11}$ ohms at 20°–25° C and 10% relative humidity.

9. An electrostatographic printing sheet prepared by the process of claim 8.

10. An electroconductive paper prepared by the process of claim 8.

11. The process of claim 8 wherein the electroconductive resin coating composition is a preformed blend of the water-soluble quaternary ammonium electroconductive resin and the water-dispersible acrylamide polymer.

* * * * *